INVENTOR.
THEODORE D. JAYNE

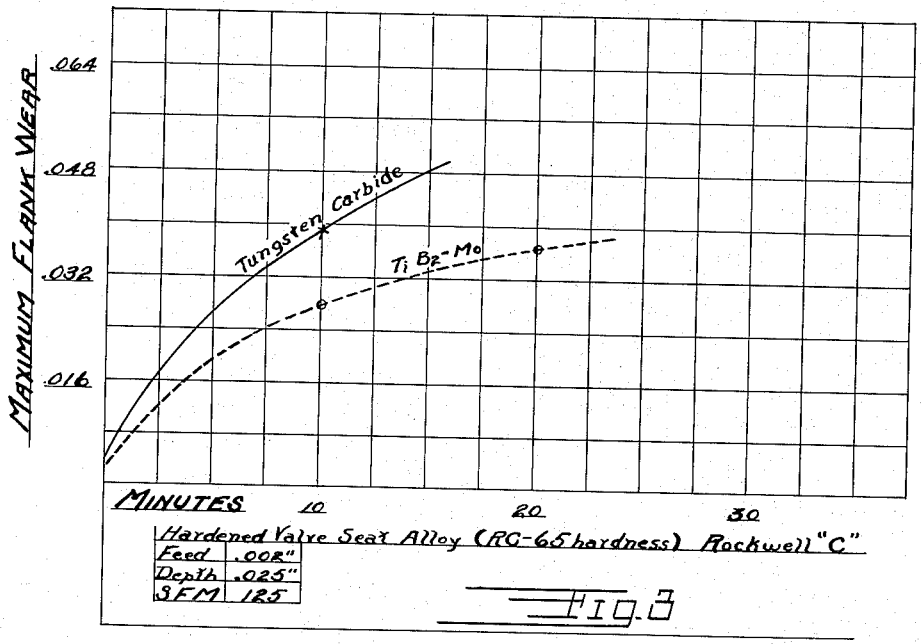
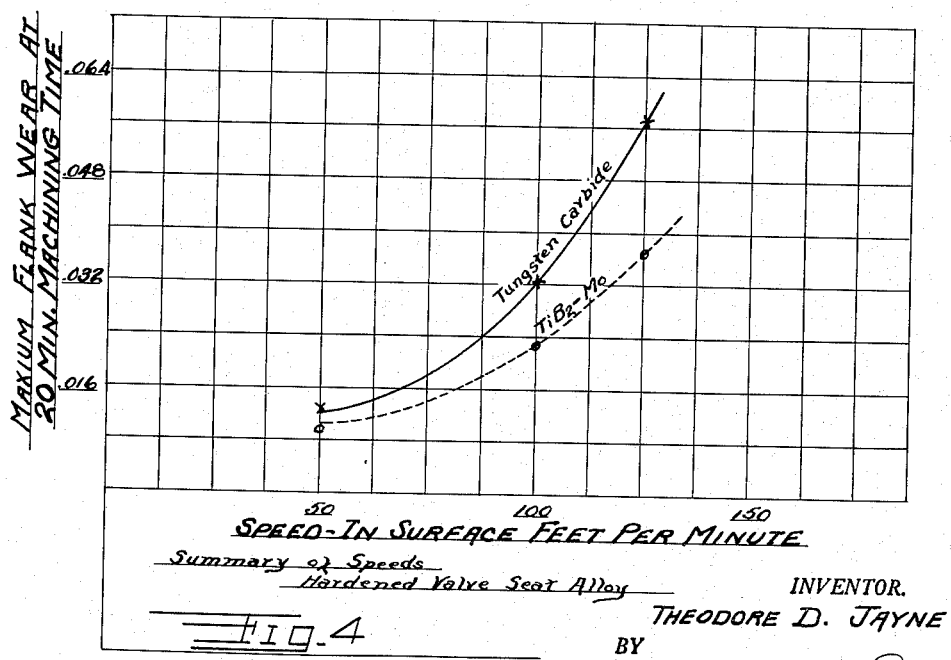

United States Patent Office 2,996,793
Patented Aug. 22, 1961

2,996,793
TOOL MATERIAL
Theodore D. Jayne, Painesville, Ohio, assignor to Rand Development Corporation, Cleveland, Ohio, a corporation of Ohio
Filed May 9, 1955, Ser. No. 506,932
2 Claims. (Cl. 29—182.5)

This invention relates to improvements in a hard cutting material useful as an abrasive in bonded grinding wheels, or as an efficient lapping compound, but whose chief use at the present would seem to be a tool material for use in high speed machining of hardened material, or the machining of highly abrasive materials such as carbon or cast iron.

An object of the present invention is to provide a tool material which is harder and more wear resistant than the best cemented tungsten carbide now in use, which has a good resistance to cratering, and which has a lower coefficient of friction (higher chip ratio) than the tungsten carbide material.

Another object of the present invention is to provide a very hard tool material composed chiefly of titanium diboride with a binder of molybdenum and in which the usual angular grains of titanium diboride are changed to a rounded and better bonded structure.

A further object of the present invention is to provide a tool material composed of approximately 78 to 80 percent of titanium diboride, 18 to 20 percent of molybdenum and small amount, preferably under 2 percent, of a metal chosen from the group copper, silver and gold.

Other objects and advantages of the present invention will be apparent from the accompanying drawings and description and the essential features thereof will be set forth in the appended claims.

In the drawings,

FIGS. 1 to 4 are graphs showing comparative tests between a tool bit constructed according to my invention and another very high grade C-7 and C-8 classification tungsten carbide cutting tool;

FIG. 5 is a photo-micrograph showing the angular grain structure of titanium diboride at a magnification of 1000; while

Figure 1:
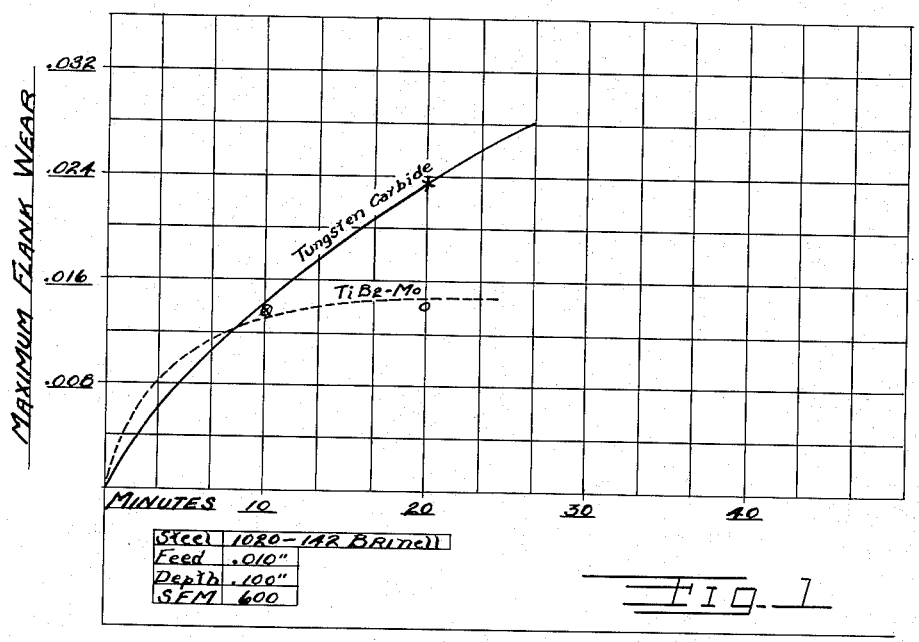

Titanium diboride has very great hardness and its high temperature properties are outstanding, maintaining high strength into the temperature range between 2900 degrees F. to 3800 degrees F., depending on preparation techniques. Oxidation and corrosion resistance coupled with hardness and abrasion resistance are also apparently maintained to these temperatures. However, it is not alone suitable for a cutting tool. It has very low ductility and is extremely difficult to grind. It is impossible to silver solder effectively. I have found that the titanium diboride when bonded with between 10 to 50 percent molybdenum, about 20 percent being preferred, makes a very outstanding tool material.

I find also that the tool material mentioned in the preceding paragraph may be improved by the addition of a very small percent, preferably under 2 percent, of a metal chosen from the group copper, silver and gold.

A typical tool material, tested as hereinafter described, is made from 80 percent titanium diboride, 20 percent molybdenum and 1 one percent copper. The titanium diboride was about 98 to 99 percent pure. The above materials, in the percentages mentioned, were ground in a ball mill to a powder, either wet or dry, but preferably wet with benzene. The size of the materials coming from the ball mill showed about 80 percent below 5 microns, 10 percent below ½ micron and 10 percent between 5 and 40 microns. This powder is then dried if wet and then made into tool bits either by a hot press or cold press method.

The tools hereinafter tested were hot pressed in graphite dies to approximately finished tool bit shape at a temperature of 1850 degrees C. to 2200 degrees C. and under a pressure of about 2000 pounds per square inch. A range of approximately 1000 to 3000 pounds per square inch appears to be satisfactory. A light finish grind was necessary to obtain the finished tool shape.

In the cold press process, the above powder as it came from the ball mill was cold pressed at approximately 15 tons per square inch and then sintered in a furnace at about 2150 degrees C. for two hours. A higher temperature for a shorter period in the furnace will do an equally good job.

Tool bits made according to the above described hot press method were than tested on a 20" by 48" geared head American Pacemaker lathe driven by a 30 horsepower D.C. motor. The bits of tool material were ½ inch square by ⅛ inch thick. These were inserted in a Kennametal model KBR–12 Kendex tool holder. The tool angles in these tool holders were as follows: back rake minus 5 degrees, side rake minus 5 degrees, side cutting edge angle plus 15 degrees, and cutting edge angle plus 15 degrees, side relief minus 5 degrees, and nose radius 3/64 inch.

On each test, the experimental tool and the comparison tool were alternated at equal increments of time. This procedure was used to reduce the effect of changes in the work material as the diameter was reduced. Each time a tool was removed from the machine, a sketch was drawn of the flank wear. At the completion of each test a sketch of the wear pattern on the top surface and the side and end flanks was made.

The feed, speed and depth were set on each comparison test and were kept constant throughout the test. The cutting speed was adjusted by a rheostat controlling a variable speed D.C. motor.

The cutting speed was computed for each new diameter of the test piece and was read in r.p.m. on a Berkeley E.P.U.T. meter. The depth of cut was checked on each cut by a micrometer measurement of the diameter before and after the cut.

FIG. 1 shows the results of such tests on S.A.E. 1020 steel, 142 Brinell, feed .010 inch, depth .100 inch, and speed 600 s.f.m.

Figure 2:
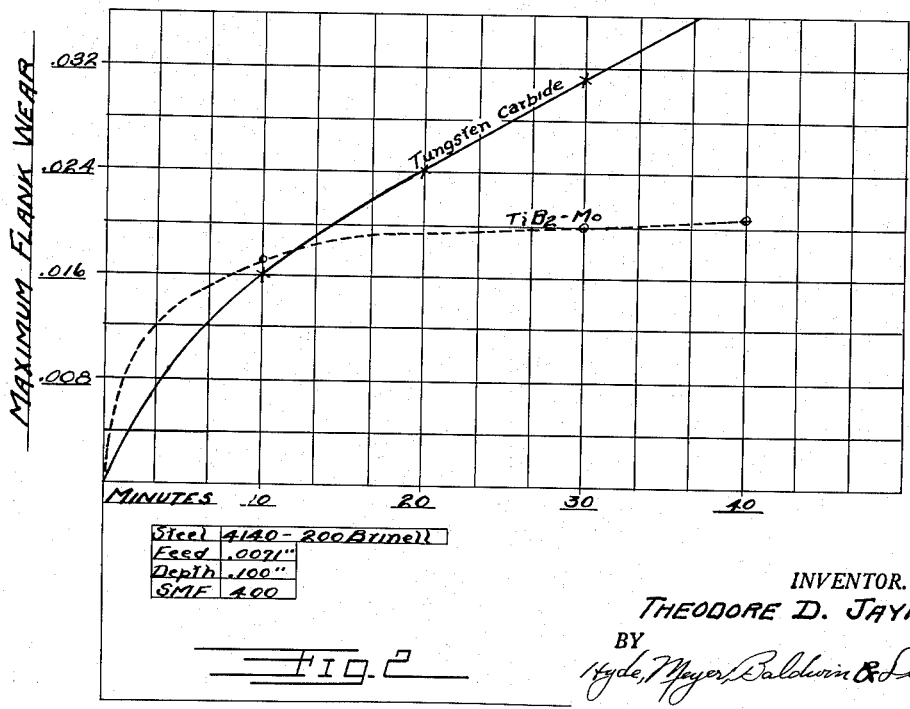

FIG. 2 shows the test on S.A.E. 4140 steel, 200 Brinell, feed .0071 inch, depth .100 inch, and speed 400 s.f.m.

FIGS. 3 and 4 relate to tests on one of the toughest alloys available under commercial machining conditions. This material is a problem when machining with the best cemented tungsten carbide tools available, because of high wear rates and corresponding short tool life. The composition of this hardened valve seat alloy is silicon 1.1 percent, molybdenum 3.3 percent, manganese 0.5 percent, chromium 3.6 percent, carbon 0.79 percent and the balance iron. Its hardness is 65 Rockwell C. The feed was .002 inch, depth .025 inch and speed 125 s.f.m. for FIG. 3. FIG. 4 shows the maximum flank wear at 20 minutes machining time at various surface speeds.

All of the above tests show the superiority of my improved tool material over a very high grade cemented tungsten carbide material.

My improved tool material is harder than tungsten carbide and shows greater resistance to flank wear.

"Build-Up" and "chip-welding" do not occur to the extent with this tool material as compared to tungsten carbide or steel tools. In fact, chip-welding has not yet been found with any of the metals so far machined, which includes all of the common metals used in the industry.

The resistance of my improved tool material to "cratering" is excellent, making the tool material good steel machining. On steel, cratering is often the cause of tool removal.

Chip ratio measurements were made on the S.A.E. 1020 steel tests. The higher the chip ratio, the less the amount of energy is expended in removing the chip from the parent metal. The chip ratio may be defined as the ratio of the chip length before cutting divided by the chip length after cutting. On the S.A.E. 1020 steel, the cemented tungsten carbide tool used for comparison gave a chip ratio of .412, while my improved tool material gave a chip ratio of .450. The higher figure for my improved tool indicates that it has less resistance to chip flow than does the cemented tungsten carbide material and, therefore, my tool material should have less tendency to crater on the top face. This fact was borne out in the tests, wherein my improved tool consistently had less cratering than the comparison tungsten carbide tool.

The properties of the hot pressed material having the composition 80 percent titanium diboride, 20 percent molybdenum and 1 percent copper were as follows: hardness 97 to 98 Rockwell 15 N.; Knoop values to 2200; Scratch hardness equal to silicon carbide; transverse rupture strength approximately twice that of titanium diboride alone in some cases; transverse rupture at 1000 degrees C. (1830 degrees F.), approximately the same as at room temperature; oxidation rate 0.38 mm. in 1000 hours at 1000 degrees C. (depth of oxide layer); thermal shock, no cracking when quenched from 1000 degrees C. into 10 degrees water; thermal expansion less than $4 \times 10^{-6}$ per degree C.; and ductility very low but above that of titanium diboride alone.

Figure 5:
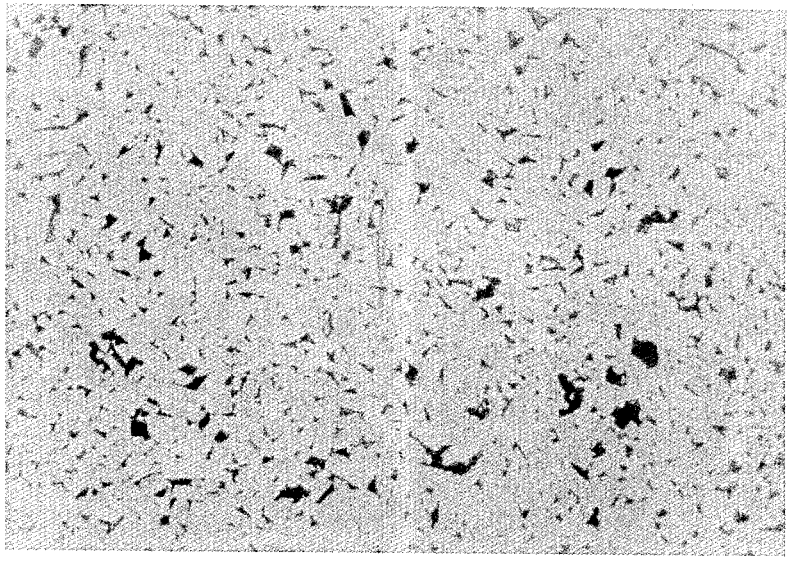
Figure 6:
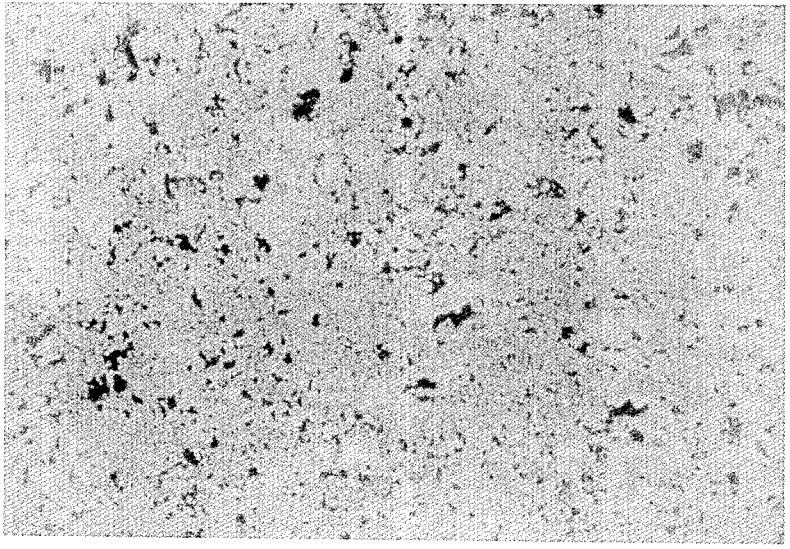
FIG. 6 is a photo-micrograph of tool material constructed according to my invention at a magnification of 1000.

The photographs of FIGS. 5 and 6 are at 1000 magnification of samples which were first polished and then photographed as polished. FIG. 5 shows the sharp and angular grain structure of titanium diboride alone and FIG. 6 shows the rounded grains and better bonded structure of my improved titanium diboride bonded with molybdenum.

What I claim is:

1. A hard cutting material composed essentially of approximately 80 percent titanium diboride and approximately 20 percent molybdenum finely divided and intimately mixed and hot pressed in the temperature range approximately 1850 degrees C. to 2200 degrees C.

2. A hard cutting material composed essentially of approximately 80 percent titanium diboride and approximately 20 percent molybdenum finely divided and intimately mixed and cold pressed and sintered at a temperature not less than approximately 2150 degrees C.

References Cited in the file of this patent

UNITED STATES PATENTS

| | | |
|---|---|---|
| 1,026,429 | Coolidge | May 14, 1912 |
| 2,116,399 | Marth | May 3, 1938 |
| 2,160,659 | Hensel | May 30, 1939 |
| 2,390,595 | Larsen et al. | Dec. 11, 1945 |